(12) United States Patent
Mufti et al.

(10) Patent No.: US 10,965,719 B2
(45) Date of Patent: *Mar. 30, 2021

(54) SERVICE CAPABILITIES IN HETEROGENEOUS NETWORK

(71) Applicant: T-Mobile USA, Inc., Bellevue, WA (US)

(72) Inventors: Shujaur Mufti, Snoqualmie, WA (US); Zeeshan Jahangir, Snoqualmie, WA (US)

(73) Assignee: T-Moblle USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/879,256

(22) Filed: May 20, 2020

(65) Prior Publication Data
US 2020/0287944 A1   Sep. 10, 2020

Related U.S. Application Data

(60) Division of application No. 16/204,296, filed on Nov. 29, 2018, now Pat. No. 10,701,109, which is a
(Continued)

(51) Int. Cl.
*G06F 15/16* (2006.01)
*H04L 29/06* (2006.01)
*H04L 29/08* (2006.01)

(52) U.S. Cl.
CPC ...... *H04L 65/1059* (2013.01); *H04L 65/1006* (2013.01); *H04L 65/1016* (2013.01);
(Continued)

(58) Field of Classification Search
CPC ............ H04L 65/1059; H04L 65/1006; H04L 65/1069; H04L 65/1073; H04L 65/1076; H04L 65/80
(Continued)

(56) References Cited

U.S. PATENT DOCUMENTS 6,785,263 B1   8/2004   Morinaga et al.
7,768,998 B1   8/2010   Everson et al.
(Continued)

FOREIGN PATENT DOCUMENTS

CN   101278278   10/2008
CN   101534229   9/2009
(Continued)

OTHER PUBLICATIONS

Chinese Office Action dated Aug. 28, 2019 for Chinese Patent Application No. 201580064492.3, 18 pages.
(Continued)

*Primary Examiner* — Hannah S Wang
(74) *Attorney, Agent, or Firm* — Lee & Hayes, P.C.

(57) ABSTRACT

In some implementations, a telecommunications network can include a core network device. The core network device can receive from a session-originating device an initiation request of a communication session, the initiation request including information of a destination and information of media capabilities. The core network device can determine network-location information of the destination, retrieve from a capability registry modification information corresponding to the network-location information, and modify the information of the media capabilities based at least in part on the modification information. The core network device can transmit the initiation request including the modified information of the media capabilities to another core network device corresponding to the network-location information. The core network device can also determine that the information of the one or more media capabilities does not correspond to the retrieved capability information and transmit a session-failure indication to the session-originating device.

20 Claims, 8 Drawing Sheets

Related U.S. Application Data continuation of application No. 14/788,591, filed on Jun. 30, 2015, now Pat. No. 10,148,703.

(60) Provisional application No. 62/062,002, filed on Oct. 9, 2014.

(52) U.S. Cl.
CPC ...... *H04L 65/1069* (2013.01); *H04L 65/1073* (2013.01); *H04L 65/1076* (2013.01); *H04L 65/605* (2013.01); *H04L 65/80* (2013.01); *H04L 67/303* (2013.01); *H04L 69/24* (2013.01)

(58) Field of Classification Search
USPC .......................................................... 709/228
See application file for complete search history.

(56) References Cited

U.S. PATENT DOCUMENTS

| | | |
|---|---|---|
| 9,749,844 B1 | 8/2017 | Sovani et al. |
| 9,826,072 B1 | 11/2017 | Filart et al. |
| 2003/0229699 A1 | 12/2003 | Moran et al. |
| 2004/0037406 A1 | 2/2004 | Gourraud |
| 2004/0148416 A1 | 7/2004 | Aarnos et al. |
| 2004/0264482 A1 | 12/2004 | Kang et al. |
| 2007/0135146 A1 | 6/2007 | Rezaiifar et al. |
| 2007/0211683 A1 | 9/2007 | Shaheen et al. |
| 2008/0062253 A1 | 3/2008 | Jaspersohn et al. |
| 2008/0080685 A1 | 4/2008 | Barnes et al. |
| 2008/0160996 A1 | 7/2008 | Li et al. |
| 2008/0240091 A1 | 10/2008 | Kesavan et al. |
| 2009/0006533 A1 | 1/2009 | Guo |
| 2009/0092061 A1 | 4/2009 | Shen |
| 2009/0154658 A1 | 6/2009 | Kasper et al. |
| 2009/0201910 A1 | 8/2009 | Kumarasamy et al. |
| 2009/0210743 A1 | 8/2009 | Gu et al. |
| 2009/0221310 A1 | 9/2009 | Chen et al. |
| 2009/0290573 A1 | 11/2009 | Belling et al. |
| 2010/0054159 A1 | 3/2010 | Zhu et al. |
| 2010/0125631 A1 | 5/2010 | Zhang et al. |
| 2010/0144325 A1 | 6/2010 | Roundtree et al. |
| 2010/0150141 A1 | 6/2010 | Lee |
| 2010/0154029 A1 | 6/2010 | Fernandez Alonso et al. |
| 2010/0184403 A1* | 7/2010 | Cai ...................... H04M 15/57 455/406 |
| 2010/0272072 A1 | 10/2010 | Bienn et al. |
| 2011/0010768 A1 | 1/2011 | Barriga et al. |
| 2011/0028130 A1 | 2/2011 | Swaminathan et al. |
| 2011/0047282 A1 | 2/2011 | Denman et al. |
| 2011/0136483 A1 | 6/2011 | Dwight et al. |
| 2011/0222532 A1 | 9/2011 | Noldus |
| 2011/0310884 A1 | 12/2011 | Arauz-Rosado |
| 2012/0002718 A1 | 1/2012 | Jun et al. |
| 2012/0185600 A1 | 7/2012 | Belling et al. |
| 2012/0225652 A1 | 9/2012 | Martinez et al. |
| 2012/0244861 A1 | 9/2012 | Agarwal et al. |
| 2013/0021998 A1 | 1/2013 | Shatsky |
| 2013/0024332 A1 | 1/2013 | Cai et al. |
| 2013/0185440 A1 | 7/2013 | Blau et al. |
| 2013/0191536 A1 | 7/2013 | Noldus et al. |
| 2013/0212293 A1 | 8/2013 | Friedman |
| 2013/0223304 A1 | 8/2013 | Tanaka et al. |
| 2013/0246052 A1 | 9/2013 | Tanaka et al. |
| 2013/0290494 A1 | 10/2013 | Goudarzi et al. |
| 2014/0050179 A1 | 2/2014 | Jung |
| 2014/0149562 A1 | 5/2014 | Xiao et al. |
| 2014/0328323 A1 | 11/2014 | Zhang et al. |
| 2014/0342739 A1 | 11/2014 | Hori |
| 2014/0372557 A1 | 12/2014 | Buckley et al. |
| 2015/0045074 A1 | 2/2015 | Wong et al. |
| 2015/0063346 A1 | 3/2015 | Eswara et al. |
| 2015/0131652 A1 | 5/2015 | Telikepalli et al. |
| 2015/0172349 A1 | 6/2015 | Gonzalez De Langarica et al. |
| 2015/0350983 A1 | 12/2015 | Kwok et al. |
| 2015/0358809 A1 | 12/2015 | Lau et al. |
| 2016/0021336 A1 | 1/2016 | Abbott et al. |
| 2016/0028790 A1 | 1/2016 | Eriksson et al. |
| 2016/0072868 A1 | 3/2016 | Poulin |
| 2016/0105468 A1 | 4/2016 | Mufti et al. |
| 2016/0127295 A1 | 5/2016 | Karimli et al. |
| 2016/0142447 A1 | 5/2016 | Mufti et al. |
| 2016/0308919 A1 | 10/2016 | Hori |
| 2016/0323425 A1 | 11/2016 | Atarius et al. |
| 2016/0380693 A1 | 12/2016 | Scott |
| 2018/0026746 A1 | 1/2018 | Bruhn et al. |
| 2018/0048748 A1 | 2/2018 | Lundstrom et al. |
| 2018/0176266 A1 | 6/2018 | Filart |
| 2018/0288105 A1 | 10/2018 | Iyer et al. |
| 2019/0173925 A1 | 6/2019 | Mufti et al. |

FOREIGN PATENT DOCUMENTS

| | | |
|---|---|---|
| CN | 102025715 | 4/2011 |
| EP | 2081349 | 7/2009 |
| EP | 2782386 | 9/2014 |
| JP | 102347950 | 2/2012 |
| WO | WO03032585 | 4/2003 |
| WO | WO2015129181 A1 | 9/2015 |
| WO | WO2016081430 | 5/2016 |

OTHER PUBLICATIONS

Extended European Search Report dated Feb. 28, 2018 for European Patent Application No. 15849735.4, 9 pages.
Extended European Search Report dated Dec. 20, 2019 for European Patent Application No. 17857504.9, 10 pages.
Extended European Search Report dated Apr. 1, 2020 for European Patent Application No. 17883216.8, a counterpart of U.S. Appl. No. 15/386,436, 9 pages.
"ETSI TS 123 334 v 13.5.0, Technical Specification", Apr. 2016, pp. 1, 4-8, 10-18, 29-46.
ETSI TS 126 114 V13.4.0, "Universal Mobile Telecommunications System (UMTS); LTE; IP Multimedia Subsystem (IMS); Multimedia Telephony; Media Handling and Interaction", Aug. 2016, pp. 236-240.
"ETSI TS 126 171 v13.0.0, Technical Specification", Jan. 2016, 14 pages.
"ETSI TS 126 190 v13.0.0, Technical Specification", Jan. 2016, pp. 1, 4-8, 13-14, 50-51.
"ETSI TS 126 201 v13.0.0, Technical Specification", Jan. 2016, 25 pages.
"ETSI TS 126 202 v13.0.0, Technical Specification", Jan. 2016, 15 pages.
"ETSI TS 126 441 v13.0.0, Technical Specification", Jan. 2016, 14 pages.
"ETSI TS 126 445 v 13.1.0, Technical Specification", May 2016, pp. 1, 4-16, 17, 20-24, 415-416, 443-445, 606-625, 636, and 638-654.
"ETSI TS 126 446 v 13.0.0, Technical Specification", Jan. 2016, 10 pages.
"EVS Registration IANA", Dec. 21, 2015, retrieved Jul. 28, 2016, at <<https://www.iana.org/assignments/media-types/audio/EVS>>, 4 pages.
GSM Association, "Rich Comminication Suite 6.0 Advnaced Commmunication Services and Client Specification" Version 7.0, Feb. 19, 2016, 581pages.
"H.248", Wikipedia, Dec. 2016, retrieved on Dec. 20, 2016 from <<https://en.wikipedia.org/wiki/H.248>>, 6 pages.
Jarvinen, K., "Enhanced Voice Services Codec for LTE", Apr. 2015, retrieved Jul. 12, 2016 at <<http://www.3gpp.org/news-events/3gpp-news/1639-evs_news>>, 2 pages.
"Multimedia Messaging Service", Wikipedia, retrieved May 24, 2017 from <<https://en.wikipedia.org/wiki/Multimedia_Messaging_Service>>, 5 pages.
Office Action for U.S. Appl. No. 15/386,436, dated Nov. 16, 2018, Filart, "Network Core Facilitating Terminal Interoperation", 41 pages.

(56) References Cited

OTHER PUBLICATIONS

Final Office Action dated Feb. 5, 2020 for U.S. Appl. No. 15/386,436 "Network Core Facilitating Terminal Interoperation" Filart, 28 pages.
Office action for U.S. Appl. No. 15/280,234, dated Feb. 9, 2017, Filart et al., "Network-Terminal Interoperation Using Compatible Payloads", 23 pages.
Office Action for U.S. Appl. No. 15/476,299, dated Apr. 12, 2019, Iyer, "Terminal Interoperation Using Called-Terminal Functional Characteristics" 24 pages.
Office action for U.S. Appl. No. 15/386,436, dated Jul. 3, 2017, Filart et al., "Network Core Facilitating Terminal Interoperation", 39 pages.
Office Action for U.S. Appl. No. 14/788,591, dated May 2, 2017, Mufti et al., "Service Capabilities in Heterogeneous Network", 22 pgs.
Office Action for U.S. Appl. No. 15/386,436, dated May 30, 2019, Filart, "Network Core Facilitating Terminal Interoperation", 32 pages.
Office action for U.S. Appl. No. 15/280,234, dated Jul. 3, 2017, Filart et al., "Network-Terminal Interoperation Using Compatible Payloads", 27 pages.
Office Action for U.S. Appl. No. 14/788,591, dated Aug. 18, 2017, Mufti, "Service Capabilities in Heterogeneous Network" 34 pages.
Office Action for U.S. Appl. No. 15/476,299, dated Sep. 18, 2019, Iyer,et al. "Terminal Interoperation Using Called-Terminal Functional Characteristics" 32 pages.
Office Action for U.S. Appl. No. 15/386,436, dated Sep. 4, 2019, Filart, "Network Core Facilitating Terminal Interoperation", 28 pages.
PCT Search Report and Written Opinion dated Jan. 22, 2016 for PCT application No. PCT/US2015/054233, 15 pages.
PCT Search Report and Written Opinion dated Jan. 26, 2018 for PCT Application No. PCT/US17/54320, 14 pages.
PCT Search Report and Written Opinion dated Apr. 13, 2018 for PCT Application No. PCT/US17/64514, 14 pages.
"Presence Simple Specification", Open Mobile Alliance, Version 2.0, Jul. 10, 2012, 102 pages.
"RCS Interworking Guidelines", GSM Association, Official Document IR 90, Version 13 0, May 6, 2016, pp. 1-3 and 11-16.
"RCS Universal Profile Service Definiition Document", GSM Association, Official Document RCC.71, Version 1.0, Nov. 16, 2016, pp. 1-5 and 97-122.

"Real Time Communication—Messaging in RCS", retrieved Aug. 22, 2017, from <<https://realtimecommunication.wordpress.com/2014/11/14/messaging-in-rcs/ >>, 12 pages.
"Rich Communication Services", Wikipedia, retrieved May 24, 2017, from <<https://en.wikipedia.org/wiki/Rich_Communication_Services>>, 9 pages.
Roach, A.B., "Session Initiation Protocol (SIP)—Specific Event Notification", Request for Comments 3265, Standards Track, Jun. 2002, pp. 3-7, 14-15, 18-19, and 21-27.
Rosenberg, J., "A Presence Event Package for the Session Initiation Protocol (SIP)", Standards Track, Request for comments: 3856, Aug. 2004, 27 pages.
Rosenberg, J., et al., "An Offer/Answer Model with the Session Description Protocol (SDP)", Request for Comments 3264, Standards Track, Jun. 2002, pp. 1-5, 9, and 12-19.
Rosenberg, J., et al., "SIP: Session Initiation Protocol", Request for Comments 3261, Standards Track, Jun. 2002, pp. 1-8 and 66-68.
Schulzrinne, H.and T. Taylor, "RTP Payload for DTMF Digits, Telephony Tones, and Telephony Signals", RFC 4733, The IETF Trust, Dec. 2006, 49 pages.
Schulzrinne, H., et al., "RPID: Rich Presence Extensions to the Presence Information Data Forma (PIDF)", Standards Track, Request for Comments: 4480, Jul. 2006, 37 pages.
Sjoberg, J., et al., "RTP Payload Format and File Storage Forma for the Adaptive Multi-Rate (AMR) and Adaptive Multi-Rate Wideband (AMR-WB) Audio Codecs", RFC 4867 (Standards Track), Apr. 2007, pp. 1-4, 13-34, 44-47.
Sugano, H., et al., "Presence Information Data Format (PIDF)", Standards Track, Request for Comments: 3863, Aug. 2004, 28 pages.
"Volte—Some Thoughts on codec Negotiation", Mar. 2016, retrieved Jul. 28, 2016, from <<https://blog.wirelessmoves.com/2016/03/volte-some-thoughts-on-Codec-negotiation.html>>, 3 pages.
"What You Really Need to Know About Video Conferencing Systems", retrieved Feb. 24, 2017 from <<http://www.c21video.com/whitepapers/what_to_know_about_video_conferencing.html>>, 12 pages.
Chinese Office Action dated Apr. 22, 2020 for Chinese Patent Application No. 201580064492.3, a counterpart of U.S. Pat. No. 10,148,703, 3 pages.
Translated Chinese Office Action dated Apr. 22, 2020 for Chinese Patent Application No. 201580064492.3, a counterpart of U.S. Pat. No. 10,148,703, 4 pages.
Office Action for U.S. Appl. No. 15/386,436, dated Aug. 3, 2020, Filart, "Network Core Facilitating Terminal Interoperation", 28 Pages.

* cited by examiner

SERVICE CAPABILITIES IN HETEROGENEOUS NETWORK

CROSS-REFERENCE TO RELATED APPLICATIONS

This application is a divisional of commonly assigned, co-pending U.S. patent application Ser. No. 16/204,296, filed Nov. 29, 2018, which is a continuation of U.S. patent application Ser. No. 14/788,591, filed Jun. 30, 2015 and entitled "Service Capabilities in Heterogeneous Network", now U.S. Pat. No. 10,148,703 and Issued Dec. 4, 2018, and which is a nonprovisional application of, and claims priority to and the benefit of, U.S. Provisional Patent Application Ser. No. 62/062,002, filed Oct. 9, 2014 and entitled "Media Policy at I-CSCF". application Ser. Nos. 16/204,296, 14/788,591, 62/062,002 and U.S. Pat. No. 10,148,703 are fully incorporated herein by reference.

BACKGROUND

A computing device configured for telecommunications, such as a wireless phone, is generally capable of processing various types and encodings of media. However, not all telecommunications devices connectable via a particular network necessarily support the same types or encodings. This can restrict users' ability to communicate with other users having different types of telecommunications devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems and techniques described herein permit computing devices to communicate data, e.g., voice or video, even when one of the intercommunicating computing devices supports a media type, encoding, or format that another one of the intercommunicating computing devices does not. As used herein, the terms "capabilities" and "media capabilities" refer to data types, encodings, formats, bit rates, protocols, underlying protocols, compression techniques, profiles, or coding/decoding procedure (codecs) that are supported by a computing device for the exchange of data with other computing devices. The term "session" as used herein includes a communications path for bidirectional exchange of data among two or more computing devices. Example sessions include voice and video calls, e.g., by which human beings converse, a data communication session, e.g., between two electronic systems or between an electronic system and a human being, or a Rich Communication Services (RCS, also known as JOYN) session. Systems and techniques herein permit devices having certain capabilities to communicate with devices not having those capabilities, e.g., without requiring the user to manually select a capability to be used. In some examples, the communication is facilitated transparently to the intercommunicating computing devices.

Many networks are "heterogeneous networks," i.e., networks including devices with various sets of capabilities. For example, many Long Term Evolution (LTE) cellular networks support voice over LTE (VoLTE) and also interconnect with the public switched telephone network (PSTN). Voice calls over VoLTE are generally encoded and decoded using an adaptive multi-rate (AMR) codec. Narrowband AMR (NB-AMR), for example, encodes audio data in the frequency range of approximately 200 Hz-3400 Hz at a sampling rate of 8 kHz into compressed data at bit rates between 4.75 kbit/s and 12.2 kbit/s. By contrast, the PSTN generally carries uncompressed audio in the 300 Hz-3400 Hz band formatted according to the International Telecommunications Union (ITU) G.711 standard as uncompressed, 8-bit pulse code modulated (PCM) logarithmically-quantized samples. A voice call between a VoLTE device and a PSTN device therefore requires transcoding between NB-AMR and G.711, in this example, or requires the VoLTE device to encode audio data using G.711 rather than NB-AMR.

Wideband AMR (AMR-WB) is another example of a codec and encodes audio data in the frequency range of approximately 50 Hz-7000 Hz into compressed data at bit rates between, e.g., 6.6 kbps and 23.85 kbps, e.g., 12.65 kbps. Enhanced Voice Service (EVS, also known as Super HD Voice and defined in Third-Generation Partnership Project, 3GPP, TS26.441 and TS36.441) is being deployed and permits transmitting 16-bit linear PCM audio samples covering frequency ranges up to 16 kHz (super wide-band, SWB) or up to 20 kHz (full-band, FB) at sampling rates of 8 kHz, 16 kHz, 32 kHz, or 48 kHz. Compressed EVS data can have bit rates between 5.9 kbit/s and 128 kbit/s, or between 6.6 kbit/s and 23.85 kbit/s for interoperability with AMR-WB. EVS can, e.g., provide the same audio quality as some prior codecs even in the presence of 2 dB additional path loss. This permits maintaining audio quality farther from the antenna, increasing the coverage radius and reducing the cost and energy consumption of network infrastructure.

As AMR-WB, EVS, and other new codecs are developed, voice calls between VoLTE devices may require transcoding or specific codec selection if one VoLTE devices supports a codec, such as EVS, that the other VoLTE device does not. Similarly, transcoding may be required for interworking with environments such as personal computers (PCs), which can use codecs such as Vorbis, e.g., in an Ogg container, or Opus, used in the WebRTC (Web Real-Time Communication) protocol.

Codecs are also used for video. Example codecs used in LTE networks include ITU H.263, Moving Picture Experts Group (MPEG) standards such as MPEG-4 part 2, and H.264/MPEG-4 part 10. However, many other video codecs are used in other environments, e.g., Theora, QUICKTIME, VP6, and VP8 in PC environments, and MPEG-1 and MPEG-2 in older PCs or telecommunication systems. As with audio, video communications between devices with different codec capabilities may require transcoding or specific codec selection. Video transcoding can be computationally expensive.

Example networks carrying sessions include second-generation (2G) cellular networks such as the Global System for Mobile Communications (GSM) and third-generation (3G) cellular networks such as the Universal Mobile Telecommunications System (UMTS). Other example networks include fourth-generation (4G) cellular networks, such as LTE carrying VoLTE sessions using Session Initiation Protocol (SIP) signaling, the PSTN using Signaling System 7 (SS7) signaling, and data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport.

In some examples, a core network device is communicatively connectable with cellular user equipment (UE) or another computing device or terminal. For example, the core network device can include an interrogating call session control function (I-CSCF). The core network device can be configured to receive from a session-originating device an initiation request of a communication session, the initiation request including information of a destination and one or more media capabilities. The core network device can determine network-location information of the destination and retrieve from a capability registry modification information corresponding to the network-location information. The core network device can then modify the information of the one or more media capabilities based at least in part on the modification information and transmit the initiation request including the modified information of the one or more media capabilities to a second core network device corresponding to the network-location information. Various examples permit interworking even when user equipment or other computing devices do not have built-in fallback or negotiation capabilities (e.g., EVS user equipment without a fallback to NB-AMR).

Various examples herein permit interworking advanced techniques with installed equipment not supporting those techniques. For example, various techniques herein permit interworking EVS codecs on a VoLTE network with non-EVS-capable VoLTE user equipment or circuit-switched user equipment. Various examples herein permit interworking between cellular and PC environments. Various examples herein permit additional or removal of offered codecs or other capabilities that are applicable to the calling party's network, computing device, or environment, but not applicable to the called party's network, computing device, or environment (e.g., VoIP calls from a Web browser or IPAD application using Opus via a WebRTC gateway to an IMS subscriber, or vice versa). Such interworking can permit introducing new voice-enhanced codecs or other capabilities, e.g., in the IMS Core with 3GPP access (e.g., VoLTE) or non-3GPP access (e.g., Wireless Local Area Network, WLAN, or WebRTC).

Figure 1:
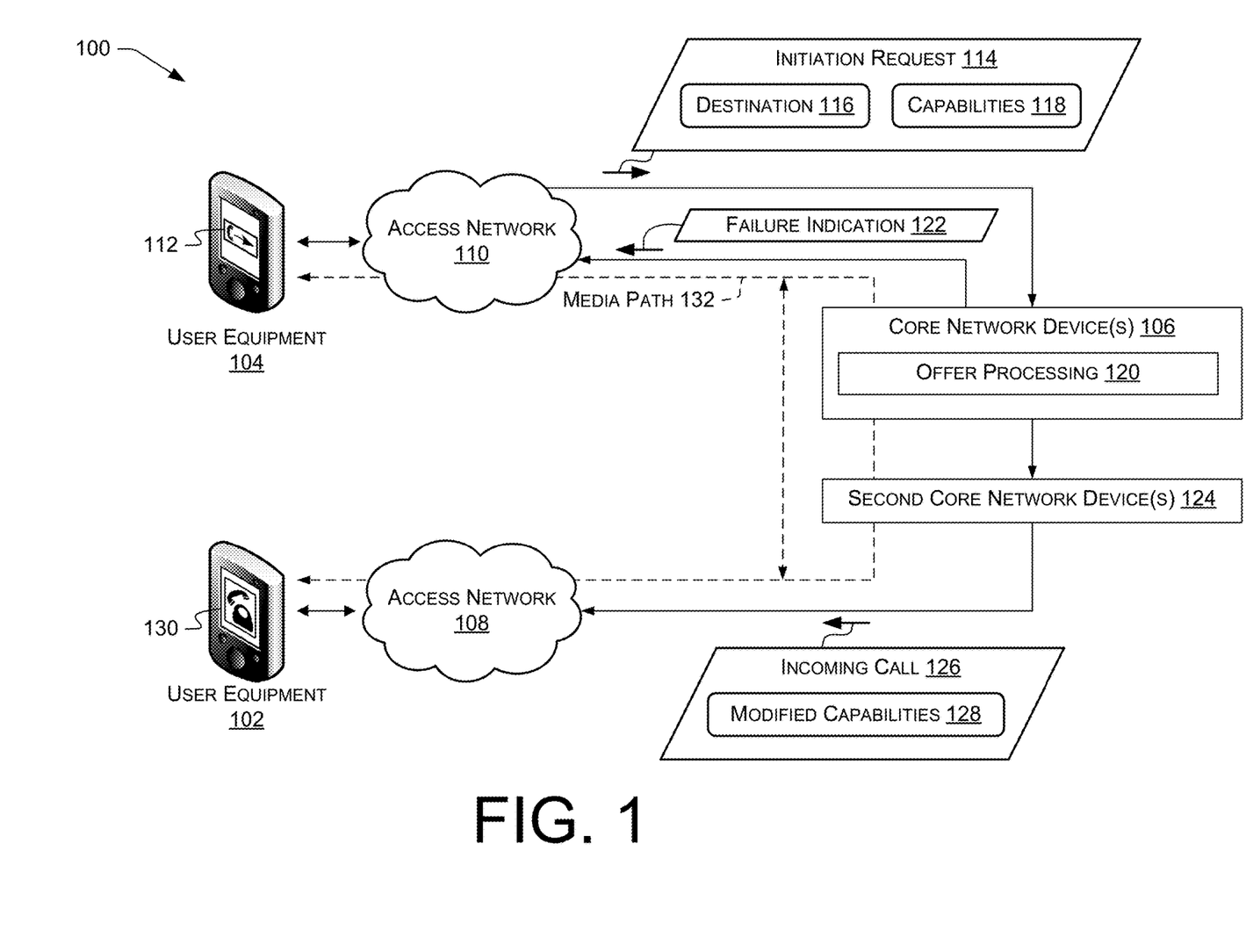
FIG. 1 is a block diagram illustrating a system for implementing capability-information modification according to some implementations.

FIG. 1 is a block diagram illustrating a telecommunication system 100 according to some examples. The system includes computing devices 102 and 104, e.g., user equipment or other mobile phones or communications devices or terminals. The computing devices 102 and 104 can be operated, e.g., by a user and a second user respectively (not shown). The computing devices 102 and 104 are communicatively connected to one or more core network device(s) 106, e.g., via respective access networks 108 and 110. The core network device(s) 106 can include, e.g., an interrogating call session control function (I-CSCF) of an Internet Protocol (IP) Multimedia Subsystem (IMS) in a VoLTE-capable network.

The computing devices 102 and 104 may be implemented as any suitable mobile computing devices configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the computing devices 102 and 104 as being "mobile" or "wireless," (e.g., configured to be carried and moved around), it is to be appreciated that the computing devices 102 and 104 may represent various types of communication devices that are generally stationary as well, such as televisions, desktop computers, game consoles, set top boxes, and the like. In this sense, the terms "communication device," "wireless device," "wireline device," "mobile device," "computing device," "user equipment," "UE," and "terminal" may be used interchangeably herein to describe any communication or computing device capable of performing techniques described herein with respect to, e.g., computing devices 102 and 104. For example, some computing devices can have specific media handling requirements and thus only accept specific media codecs or components in a session description.

When the second user desires to place a call to the first user, the computing device 104, e.g., in response to actuation by the second user of a "Send" control 112, transmits an initiation request 114 of a communication session. The computing device 104 is an example of a session-originating device, i.e., a computing device initiating a communication session with another computing device. Session-originating devices can include user equipment or other telecommunications or computing devices communicatively connectable with other computing devices via one or more core network device(s) 106. Mobile phones and copper-loop landline phones can be examples of session-originating devices.

The initiation request 114, e.g., an outgoing voice call, includes information of a destination 116, i.e., a computing device 102 with which computing device 104 is requesting a session be established. In this example, only one destination is shown, namely the computing device 102. However, the initiation request 114 can specify any number of destinations. The initiation request 114 also includes information 118 of one or more media capabilities of the computing device 104. The information 118 of the one or more media capabilities is also referred to as an "offer." In an example, the initiation request 114 includes a SIP INVITE message having a Session Description Protocol (SDP) body including a session description, e.g., the information 118 of the one or more media capabilities.

The core network device(s) 106 receive from the computing device 104 the initiation request 114 and performs offer processing 120, described below with reference to FIG. 2. In some examples, based, on the information 118 of the capabilities, the offer processing transmits a session-failure indication 122 to the computing device 104 indicating the session cannot be established.

In some examples, the offer processing 120 modifies the information 118 of the one or more media capabilities, e.g., based on an indication of a network to which the destination is connected. The core network device(s) 106 then transmits the initiation request including the modified information of the one or more media capabilities to one or more second core network device(s) 124 corresponding to the destination, or directly to the destination, e.g., to the computing device 102. In some examples, the second core network device(s) 124 include a serving call session control function (S-CSCF) communicatively connected with the computing device 102.

The computing device 102 thus receives an initiation request including modified information 126 of the one or more media capabilities. This initiation request is illustrated as incoming call 128. The computing device 102 can respond, e.g., by alerting the first user and transmitting a SIP 180 Ringing response to the computing device 104. The user of the computing device 102 can then indicate the call should be accepted, e.g., by operating a call-acceptance control 130 such as a touchscreen button. The computing device 102 can then accept the initiation request, e.g., by sending a SIP 200 OK response to the computing device 104. Call initiation can be performed, e.g., as defined in the Global System for Mobile (GSM) or Voice-over-Long Term Evolution (VoLTE) standards, and can include the exchange of additional messages (not shown) between the computing devices 102 and 104 and the core network device(s) 106. Data of the session, such as audio data or video data formatted as specified in the modified information 126, can be exchanged between computing devices 102 and 104 via a communications channel depicted as media path 132, which, as shown, can pass through core network device(s) 106, 124 or can bypass core network device(s) 106, 124.

Figure 2:
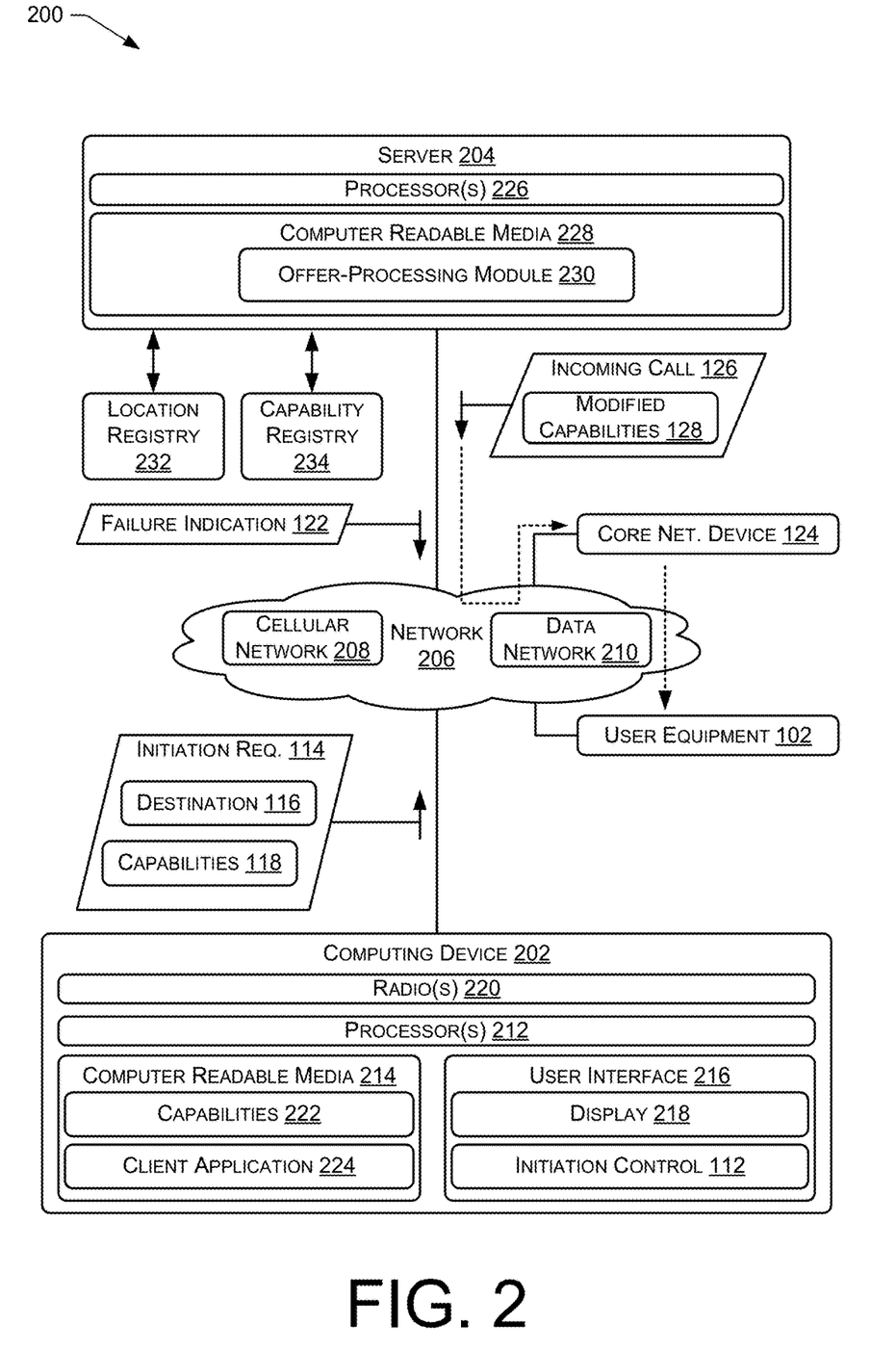
FIG. 2 is a block diagram illustrating a system for implementing capability-information modification according to some implementations.

FIG. 2 is a block diagram illustrating a system 200 permitting capability-information modification according to some implementations. The system 200 includes a computing device 202, e.g., a wireless phone or other user equipment such as computing device 102 or 104, FIG. 1, coupled to a server 204 via a network 206. The server 204 is an example of the core network device(s) 106, FIG. 1, e.g., an I-CSCF, S-CSCF, or Intelligent Policy Control Function (IPCF).

The network 206 can include one or more networks, such as a cellular network 208 and a data network 210. The network 206 can include one or more core network(s) connected to user equipment via one or more access network (s). Example access networks include LTE, WIFI, GSM EDGE Radio Access Network (GERAN), UMTS Terrestrial Radio Access Network (UTRAN), and other cellular access networks.

The cellular network 208 can provide wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 204 and computing devices such as the computing device 202 can additionally or alternatively be performed using other technologies, such as wired (Plain Old Telephone Service, POTS, or PSTN lines), optical (e.g., Synchronous Optical NETwork, SONET) technologies, and the like.

The data network 210 can include various types of networks for transmitting and receiving data (e.g., data packets), including networks using technologies such as WIFI, IEEE 802.15.1 ("Bluetooth"), Asynchronous Transfer Mode (ATM), WIMAX, and other network technologies, e.g., configured to transport Internet Protocol (IP) packets. In some examples, the server 204 includes or is communicatively connected with an interworking function (IWF) or other device bridging networks, e.g., LTE, third-generation cellular (3G), and POTS networks. In some examples, the server 204 can bridge SS7 traffic from the PSTN into the network 206, e.g., permitting PSTN customers to place calls to cellular customers and vice versa.

In some examples, the cellular network 208 and the data network 210 can carry voice or data. For example, the data network 210 can carry voice traffic using Voice over Internet Protocol (VoIP) or other technologies as well as data traffic, or the cellular network 208 can carry data packets using High Speed Packet Access (HSPA), LTE, or other technologies as well as voice traffic. Some cellular networks 208 carry both data and voice in a packet-switched format. For example, many LTE networks carry voice traffic in data packets according to the voice-over-LTE (VoLTE) standard. Various examples herein provide origination and termination of, e.g., carrier-grade voice calls on, e.g., circuit-switched (CS) networks 206 or mixed VoLTE/3G networks 206, and on computing devices 202 including original equipment manufacturer (OEM) handsets and non-OEM handsets.

The computing device 202 can be or include a wireless phone, a wired phone, a tablet computer, a laptop computer, a wristwatch, or other type of computing device. The computing device 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., random access memory (RAM), solid state drives (SSDs), or the like), disk drives (e.g., platter-based hard drives), another type of computer-readable media, or any combination thereof. The computing device 202 can further include a user interface (UI) 216, e.g., including an electronic display device 218, a speaker, a vibration unit, a touchscreen, or other devices for presenting information to a user and receiving commands from the user. The user interface 216 can include a session-initiating user interface control 112, e.g., a touchscreen button, to indicate a communication session should be initiated. The user interface 216 or components thereof, e.g., the display 218, can be separate from the computing device 202 or integrated (e.g., as illustrated in FIG. 1) with the computing device 202. The computing device 202 can further include one or more radio(s) 220 configured to selectively communicate wirelessly via the network 206, e.g., via an access network 108 or 110, or one or more transceivers (not shown) configured to selectively communicate using wired connections via the network 206.

The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 226. Tangible computer-readable media can include volatile and nonvolatile, removable and non-removable media implemented in any method or technology for storage of information, such as computer readable instructions, data structures, program modules, or other data.

The computer readable media 214 can store information 222 of one or more capabilities of the computing device 202. The information 222 can include, e.g., indications of voice or video codecs supported by the computing device 202.

The computer readable media 214 can include processor-executable instructions of a client application 224. The client application 224, e.g., a native or other dialer, can permit a user to originate and terminate communication sessions associated with the computing device 202, e.g., a wireless phone. In some examples, the computing device 202 can transmit the initiation request 114 indicating the destination 116 and the information 118 of the capabilities to the server 204. The server 204 can receive from the computing device 202 or other session-originating device the initiation request 114 of a communication session, the initiation request 114 including information of a destination 116 and information 118 of one or more media capabilities, e.g., as discussed above with reference to FIG. 1.

The server 204 can include one or more processors 226 and one or more computer readable media 228. The computer readable media 228 can be used to store processor-executable instructions of an offer-processing module 230. The processor-executable instructions can be executed by the processors 226 to perform various functions described herein. In some examples (not shown), the computer readable media 228 or another component of the server 204 also stores a location registry, discussed below. In some examples (not shown), the computer readable media 228 or another component of the server 204 also stores a capability registry, discussed below. In some examples, the server 204 is communicatively connected with a location registry 232 and a capability registry 234. The server can retrieve information from the location registry and the capability registry via, e.g., a SIP MESSAGE request, a SIP NOTIFY request (and corresponding SIP 200 OK response from the queried registry) or an HTTP request such as a GET to a Web Services or Representational State Transfer (REST) application programming interface (API) endpoint.

In some examples, the server 204 is communicatively connected with a location registry 232 separate from the server 204, e.g., a Diameter or ENUM server such as a Home Subscriber Server (HSS), Home Location Register (HLR), a DNS server, or other server capable of responding to a location information request (LIR) or other request for network-location information of the called party. The location registry 232 can be embodied in a core network device communicatively connected with the server 204, and the server 204 can be configured to (e.g., by executing instructions stored in computer-readable media 228) retrieve the network-location information from the location registry 232. In some examples, the network-location information can include an indication of whether the destination 116 is connected to a network of the same type as the network to which the computing device 202 is connected. In some examples, the network-location information includes a Diameter result code. As used herein, it is not required that "location" or "network location" relate to physical locations; "location" can refer to a virtual location such as a network address or routing path.

For example, the computing device 202 can be VoLTE user equipment, and the network-location information can include an indication that the destination is connected to a VoLTE network or a non-VoLTE network. A "non-VoLTE network" can be any network not capable of transmitting IP packets to an IMS to control a VoLTE session. The network-location information can include an indication that the destination is IMS-capable UE connected to the same IMS as the computing device 202 via a packet network such as LTE (e.g., a Diameter 2001 Success result code including the address of a registered S-CSCF serving the UE), that the destination is IMS-capable UE connected via a non-packet network, e.g., a legacy 2G or 3G network (e.g., a Diameter 2003 Unregistered Service result code), or non-IMS-capable UE such as a PSTN phone or GSM-only phone (e.g., a Diameter 5001. User Unknown result code). The network-location information can include an indication of a network to which the destination 116 is connected, e.g., an address of the registered S-CSCF.

In some examples, the server 204 is communicatively connected with a capability registry 234 separate from the server 204. The capability registry 234 can include a database storing information, such as capability information or modification information of capabilities. The information in the capability registry 234 can be stored in association with, or keyed by, the network-location information. The server 204 can thus be configured to (e.g., by executing instructions stored in computer-readable media 228) retrieve from the capability registry 234 capability information or modification information corresponding to the network-location information.

The modification information can specify one or more capabilities to remove from the information of the one or more media capabilities. The one or more capabilities to remove can include, e.g., one or more codecs. The modification information can additionally or alternatively specify one or more capabilities to add to the information of the one or more media capabilities. The one or more capabilities to add can include, e.g., one or more codecs. For example, the modification information can specify removing EVS to a non-VoLTE destination, or adding G.711 to a PSTN destination.

The server 204 can modify the information 118 of the one or more media capabilities based at least in part on the modification information. The server 204 can then transmit the initiation request (incoming call 128) including the modified information 126 of the one or more media capabilities to a second core network device 124. The second core network device 124 corresponds to the network-location information. For example, the second core network device 124 can be an S-CSCF of the terminating user equipment or a Breakout Gateway Control Function (BGCF) for bridging calls to non-VoLTE networks. As graphically indicated by the dashed arrows, the second core network device 124 can receive the incoming call 128 from the server 204 and pass it to the computing device 102 (user equipment).

In some examples, the capability registry 234 stores capability information. The capability information can specify acceptable codecs for the destination, e.g., only G.711 for a PSTN destination, or AMR-WB and NB-AMR for a VoLTE destination that does not support EVS. The server 204 can be configured to determine that the information 118 of the one or more media capabilities does not correspond to the retrieved capability information. In response, the server 204 can transmit a session-failure indication 122 (FIG. 1), e.g., a SIP 488. Not Acceptable response, to the computing device 202 originating the communications session.

In some examples, the session-failure information can provide the computing device 202 information about the capability mismatch. For example, the capability information can include information of one or more codecs corresponding to the network-location information and the server 204 can transmit the session-failure indication including at least some of the information of the one or more codecs. This permits the originating computing device 202 to retry the session initiation using a codec or other capability known to correspond with the capability information of the terminating device or network. In some examples, the session-failure indication 122 can indicates one or more of the media capabilities that do not correspond to the retrieved capability information. This permits the originating computing device 202 to retry the session initiation without using a codec or other capability known to fail to correspond with the capability information of the terminating device or network.

Figure 3:
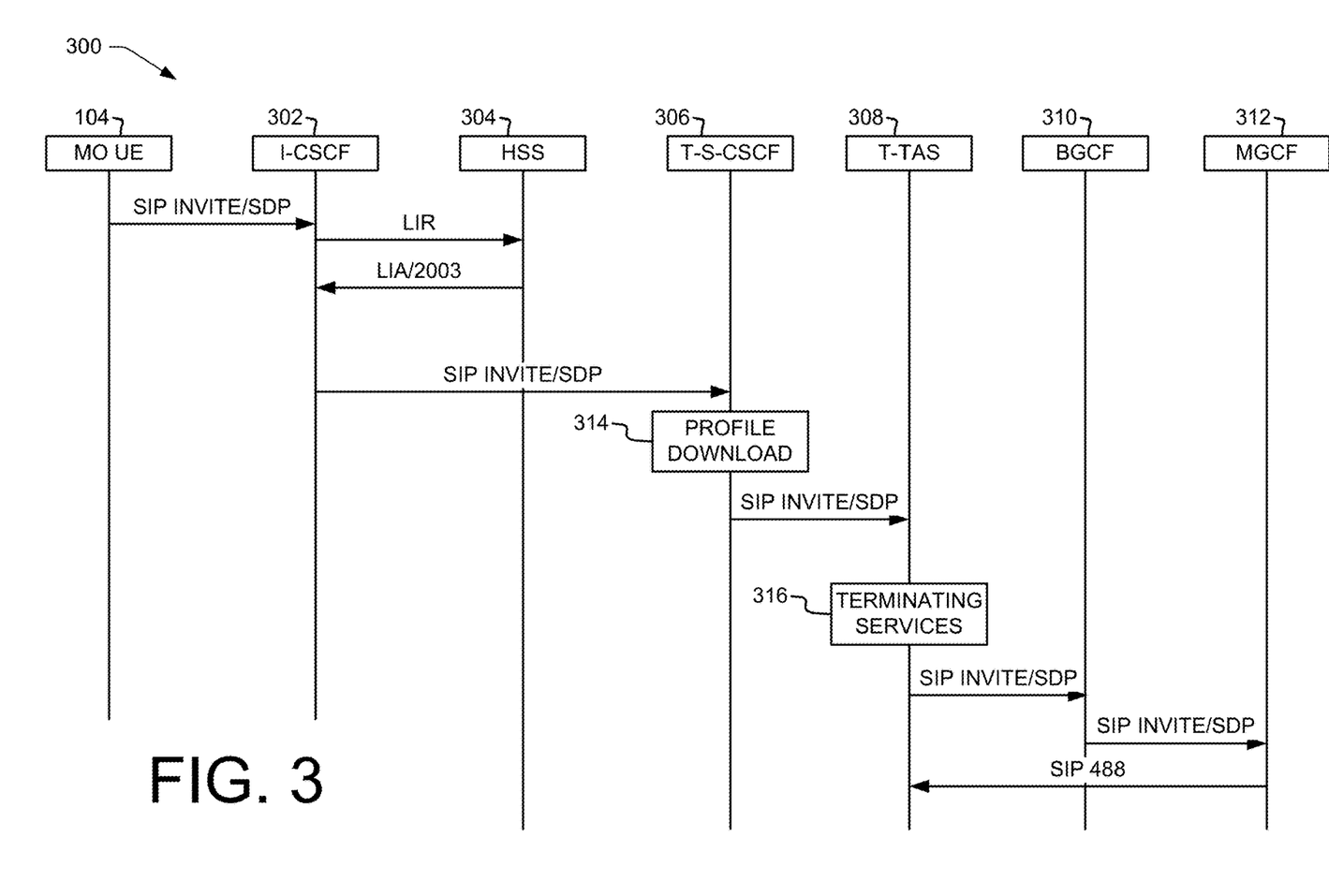
FIG. 3 shows a call flow illustrating an example session-setup failure.

FIG. 3 shows a call flow 300 illustrating an example session-setup failure of a session, e.g., from a VoLTE UE to an IMS-capable UE connected via a circuit-switched network such as a 2G/3G network. The session is from originating (MO) UE (e.g., computing device 104) to a terminating (MT) UE (not shown). The terms "MO" and "MT" are used herein for brevity and do not require any device so identified be a mobile device. Several core network devices are shown, including an I-CSCF 302, an HSS 304, an S-CSCF connected with the terminating UE (T-S-CSCF) 306, a terminating telephony application server (T-TAS) 308, a BGCF 310 configured to communicatively interconnect the IMS and circuit-switched networks, and a Media Gateway Controller Function (MGCF) 312. Not all core network devices are shown.

As shown, the MO UE 104 sends a session-initiation request in the form of a SIP INVITE with an SDP message body. In this example, the SDP message offers to use any of the EVS, WB-AMR, AMR, or G.711 codecs to exchange audio. When the session-initiation request reaches the I-CSCF 302, the I-CSCF 302 sends a location information request (LIR) to the HSS 304. In this example, the HSS 304 responds with a Diameter 2003. Unregistered Service response code, indicating the MT UE user has an HSS profile and is IMS capable, but is not registered in the same IMS network as the MO UE 104. For example, the user may be outside the LTE coverage area and connected via 2G or 3G instead.

In response to the Diameter 2003 response code, the I-CSCF 302 sends a SIP INVITE with the SDP body to a default terminating S-CSCF 306 for the MT UE. At block 314, the T-S-CSCF 306 retrieves information about the MT UE from a terminating HSS (not shown). The T-S-CSCF 306 forwards the INVITE to the T-TAS 308. At block 316, the T-TAS 308, e.g., sends a Send Routing Information (SRI) message to the Home Location Register (HLR) of the MT UE. The T-TAS 308 can use information from the HLR to route the session invitation. Alternatively, in the option shown, the T-TAS 308 can break out the session to the BGCF 310, which can locate the MGCF 312 corresponding to the MT UE and send the session-initiation message to the MGCF 312. The session-initiation message to the MGCF 312 in this example includes an SDP body listing the same media capabilities as the original SIP INVITE/SDP from the MO UE 104. Signaling from the MGCF 312 to the MT UE is omitted for brevity.

In the illustrated example, the MGCF 312 does not support the EVS codec offered in the SDP body. The MGCF 312 therefore returns a SIP 488. Not Supported response code to the T-TAS 308 (e.g., via the BGCF 310). This SIP 488 response is passed upstream to the MO UE 104 (arrows omitted for brevity). The MO UE 104 drops (discontinues) the session upon receiving the SIP 488 response.

Some network devices or user equipment, e.g., the MGCF 312 in this example, reject session-initiation requests if any of the codecs or other capabilities in the request are unrecognized by, or unknown to, that device, even if other codecs in the request are recognized by that device. In some examples not shown, the MGCF 312 passes the SIP INVITE to the MT UE, and the MT UE sends the SIP 488 response if the MT UE does not recognize one or more codec(s) or other capabilities. In some examples of IMS-to-IMS Network-to-Network Interconnection (NNI) of VoLTE calls, the terminating-side IMS, e.g., the T-S-CSCF 306 or an I-CSCF, P-CSCF, or MGW of the terminating-side IMS, can respond with a SIP 488 if the terminating-side IMS does not support one or more capabilities in the offer.

Figure 4:
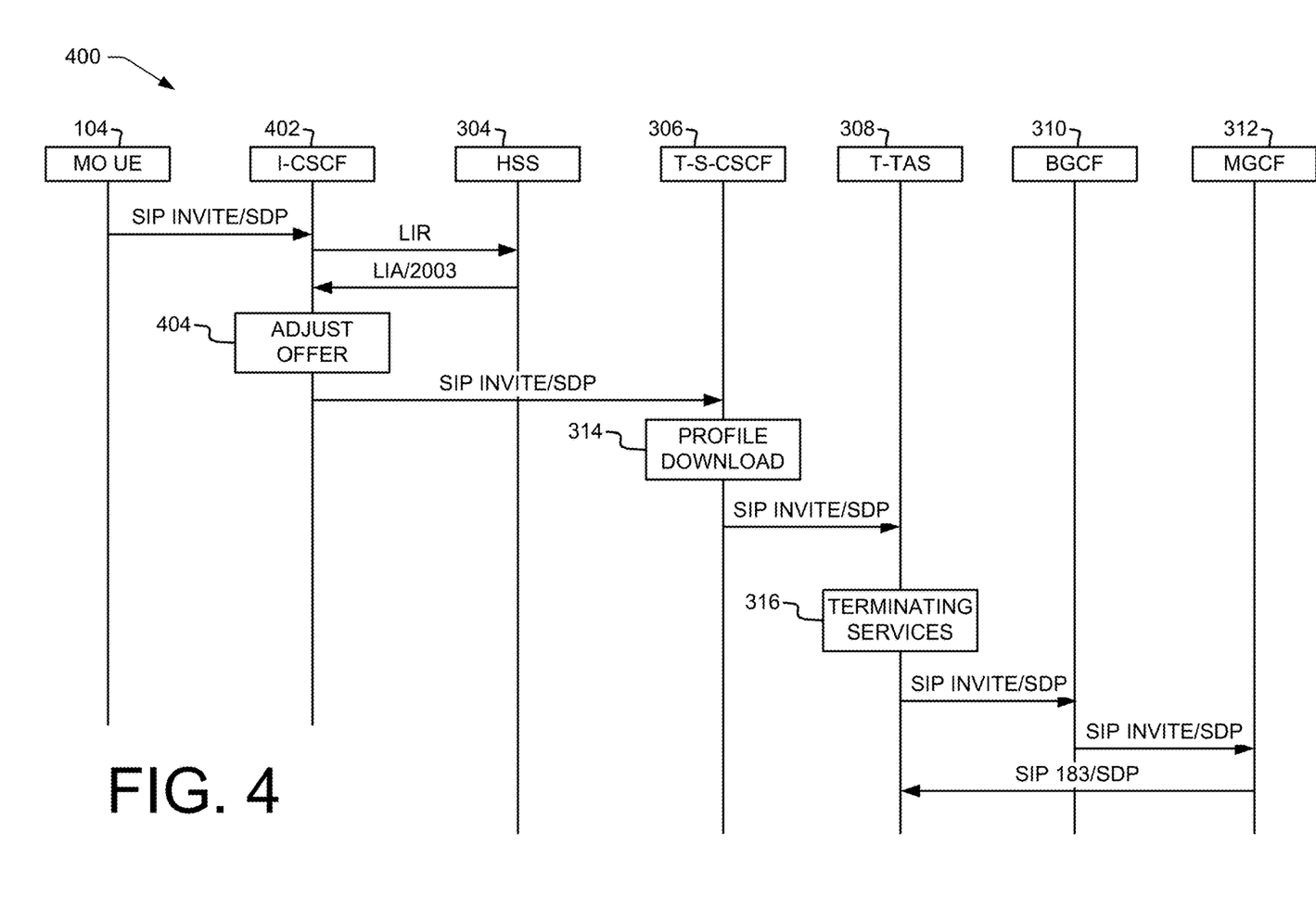
FIG. 4 shows an example call flow.

FIG. 4 shows an example call flow 400, e.g., from a VoLTE UE to an IMS-capable UE connected via a circuit-switched network such as a 2G/3G network. This call flow is as shown in FIG. 3 except as noted. In some examples, a proxy call session control function (P-CSCF) implementing a WebRTC gateway or other bridging protocol or function is used. Functions and transmissions described with respect to the MGCF 312 can be performed as appropriate with respect to such a P-CSCF.

The initial SIP INVITE from MO UE 104 includes an SDP body specifying, e.g., EVS, WB-AMR, AMR, and G.711 codecs. The I-CSCF 402 receives the INVITE, sends the LIR, and receives the LIA with a Diameter 2003 response code as discussed above with reference to FIG. 3. In some examples, e.g., of NNI, the S-CSCF can perform the ENUM query and modify information as described below with reference to block 404.

At block 404, the I-CSCF 402 determines network-location information of the destination (e.g., specified in the SIP message), retrieves from the capability registry modification information corresponding to the network-location information, and modifies the information of the one or more media capabilities (e.g., in the SDP body), e.g., based at least in part on the modification information. In this example, the I-CSCF 402 removes the EVS codec from the information of the media capabilities since non-VoLTE subscribers in this example are not capable of processing EVS audio. The I-CSCF 402 thus sends the T-S-CSCF 306 a SIP INVITE with a modified SDP body offering only the WB-AMR, AMR, and G.711 codecs. The modification can be performed using, e.g., deep packet inspection processors.

The modified SIP INVITE is passed to the MGCF 312 as discussed above with reference to FIG. 3. In this example, when the MGCF 312 receives the SIP INVITE, the MGCF 312 determines that the offered codecs, namely WB-AMR, AMR, and G.711, are acceptable. Accordingly, the MGCF 312 responds with a SIP 183. Session in Progress response including an SDP body specifying that, e.g., WB-AMR, AMR-NB, or G.711 codecs are acceptable. The SIP 183 response is passed back towards the MO UE 104 (steps omitted for brevity) and the session is successfully established (further exchanges after the SIP 183 omitted for brevity, and likewise throughout). Modifying the offer thus permits initiating communication sessions with devices such as the example MGCF 312 that reject session-initiation requests based on the presence of any unknown codec or capability.

Figure 5:
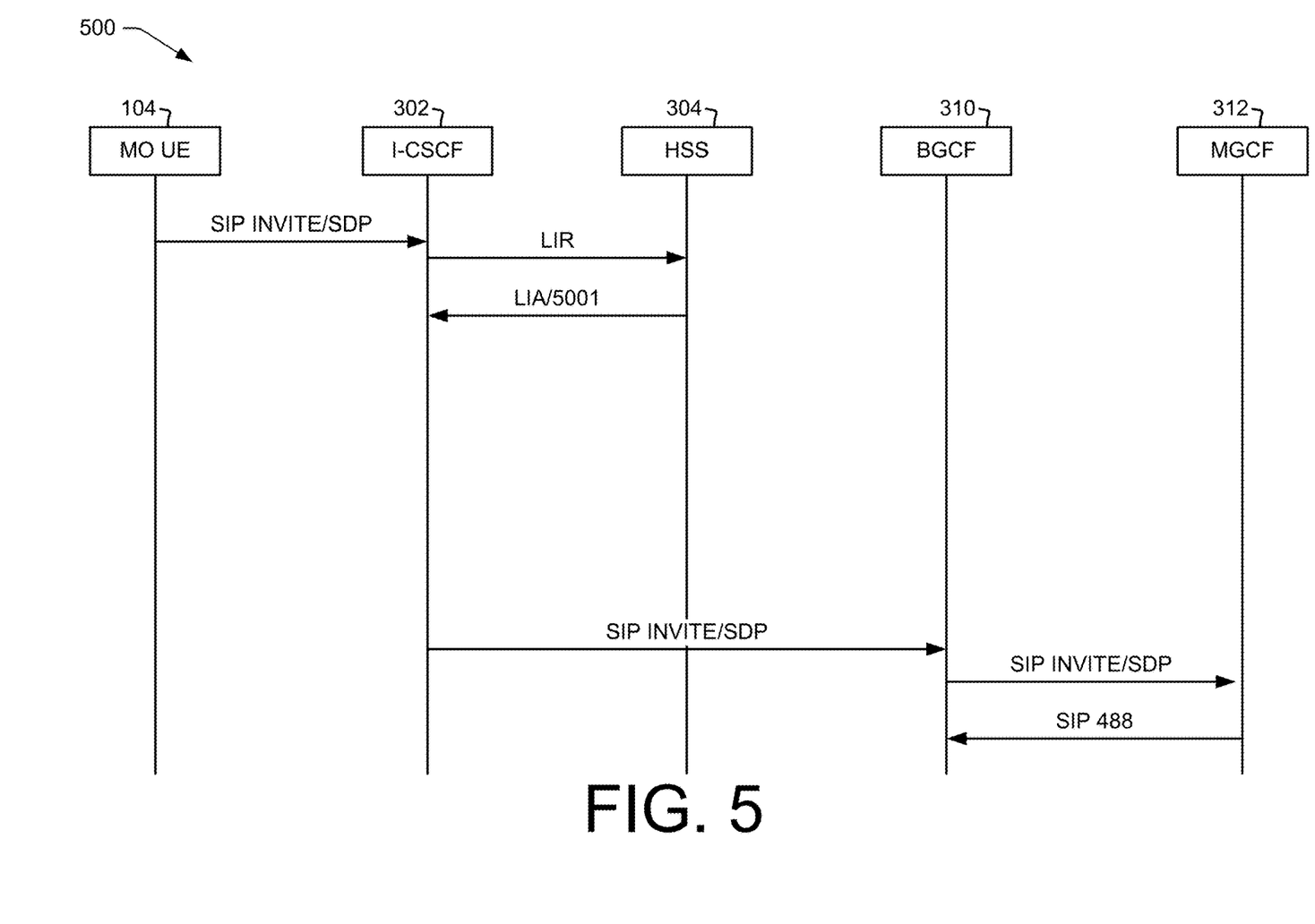
FIG. 5 shows a call flow illustrating an example session-setup failure.

FIG. 5 shows a call flow 500 illustrating an example session-setup failure of a session, e.g., from a VoLTE UE to a non-IMS-capable terminating UE, e.g., a dedicated 2G/3G phone or a PSTN phone (referred to for brevity as an "MT UE"). As shown, the MO UE 104 sends a session-initiation request in the form of a SIP INVITE with an SDP message body. As in FIG. 3, the SDP body offers the EVS, WB-AMR, AMR, and G.711 codecs. The I-CSCF 302 sends a location information request (LIR) to the HSS 304 as shown in FIG. 3. In this example, the HSS 304 responds with a Diameter 5001. User Unknown response code, indicating the MT UE is not IMS capable, e.g., is a PSTN or 2G-only phone.

In response to the Diameter 5001 response code, the I-CSCF 302 breaks out the session to the BGCF 310, which locates the MGCF 312 corresponding to the MT UE and sends the session-initiation message to the MGCF 312. The session-initiation message to the MGCF 312 in this example includes an SDP body listing the same media capabilities as the original SIP INVITE/SDP from the MO UE 104. Signaling from the MGCF 312 to the MT UE is omitted for brevity.

In the illustrated example, the MGCF 312 does not support the EVS codec offered in the SDP body of the session-initiation message. The MGCF 312 therefore returns a SIP 488. Not Supported response code to the BGCF 310. This SIP 488 response is passed upstream to the MO UE 104 (arrows omitted for brevity). The MO UE 104 drops the session upon receiving the SIP 488 response.

Figure 6:
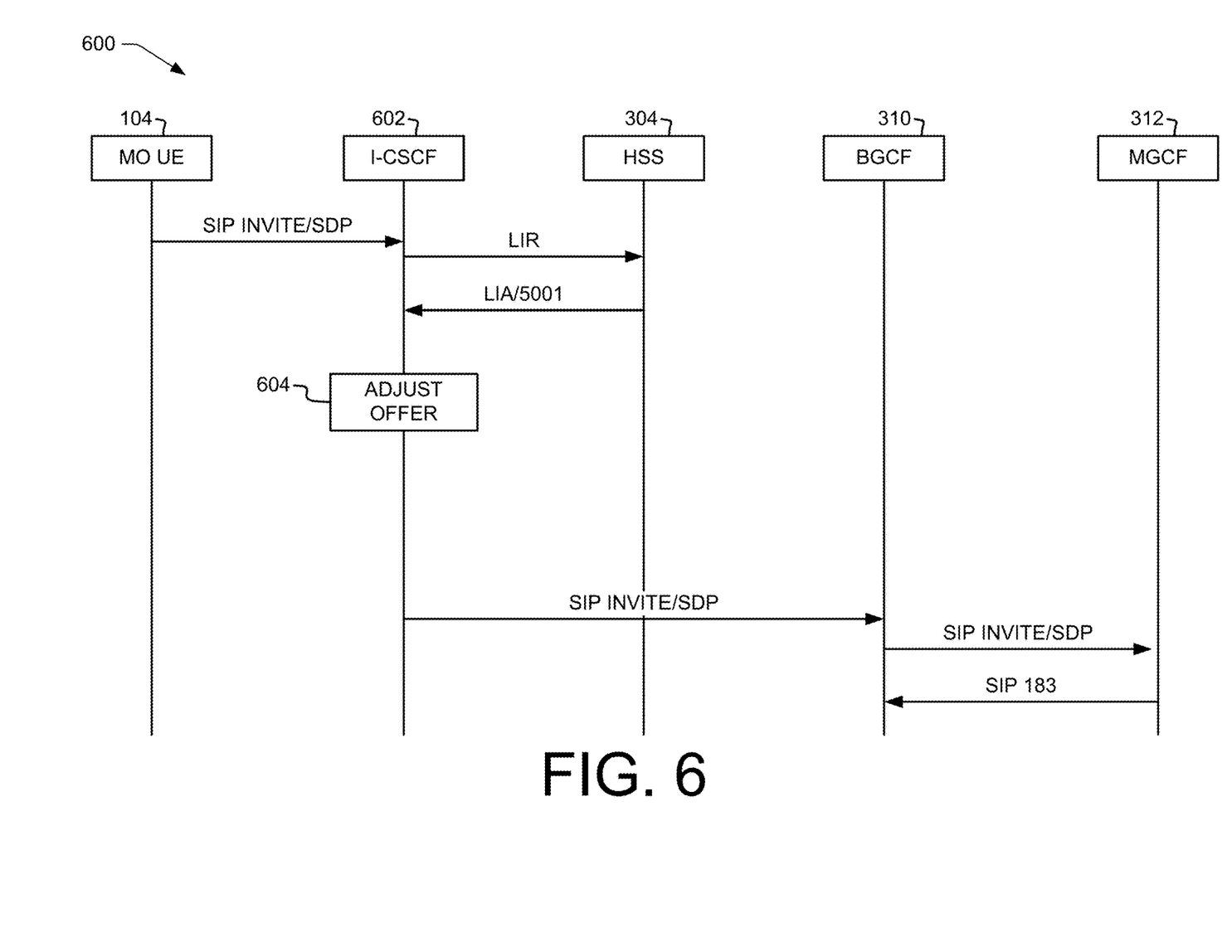
FIG. 6 shows an example call flow.

FIG. 6 shows an example call flow 600, e.g., from a VoLTE UE to a non-IMS-capable MT UE. This call flow is as shown in FIG. 5 except as noted. The initial SIP INVITE from MO UE 104 includes an SDP body specifying, e.g., EVS, WB-AMR, AMR, and G.711 codecs. The I-CSCF 602 receives the INVITE, sends the LIR, and receives the LIA with a Diameter 5001 response code as discussed above with reference to FIG. 5.

At block 604, the I-CSCF 602 determines network-location information of the destination (e.g., specified in the SIP message), retrieves from the capability registry modification information corresponding to the network-location information, and modifies the information of the one or more media capabilities (e.g., in the SDP body), e.g., based at least in part on the modification information. In this example, the I-CSCF 602 removes the EVS codec from the information of the media capabilities since non-VoLTE subscribers in this example are not capable of processing EVS audio. The I-CSCF 602 thus sends the BGCF 310 a SIP INVITE with a modified SDP body offering only the WB-AMR, AMR, and G.711 codecs.

The modified SIP INVITE is passed to the MGCF 312 as discussed above with reference to FIG. 5. In this example, when the MGCF 312 receives the SIP INVITE, the MGCF 312 determines that the offered codecs, namely WB-AMR, AMR, and G.711, are acceptable. Accordingly, the MGCF 312 responds with a SIP 183. Session in Progress response including an SDP body specifying that, e.g., WB-AMR, AMR-NB, or G.711 codecs are acceptable. The SIP 183 response is passed back towards the MO UE 104 (steps omitted for brevity) and the session is successfully established.

Figure 7:
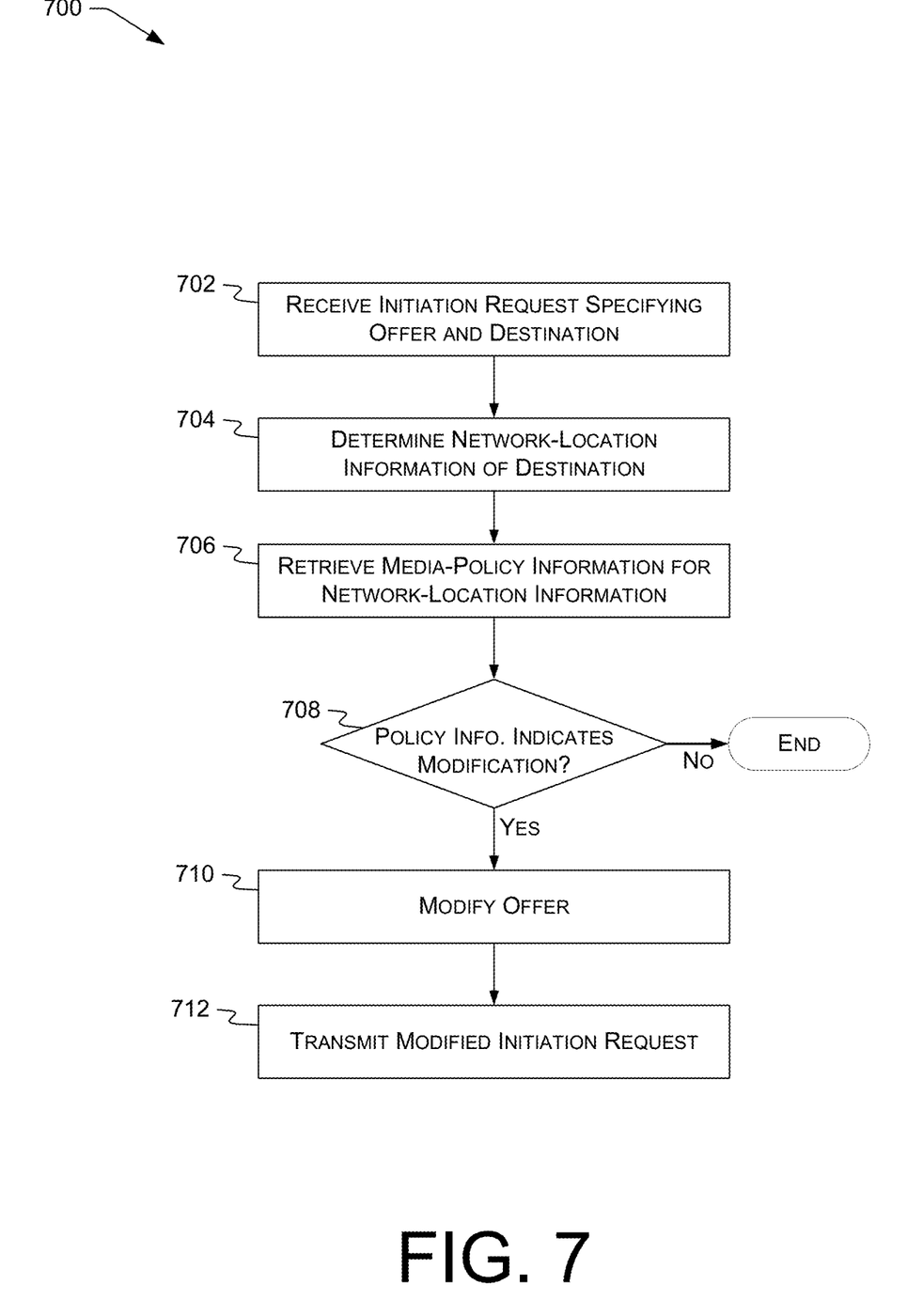
FIG. 7 illustrates an example process for establishing a communication session according to some implementations.
Figure 8:
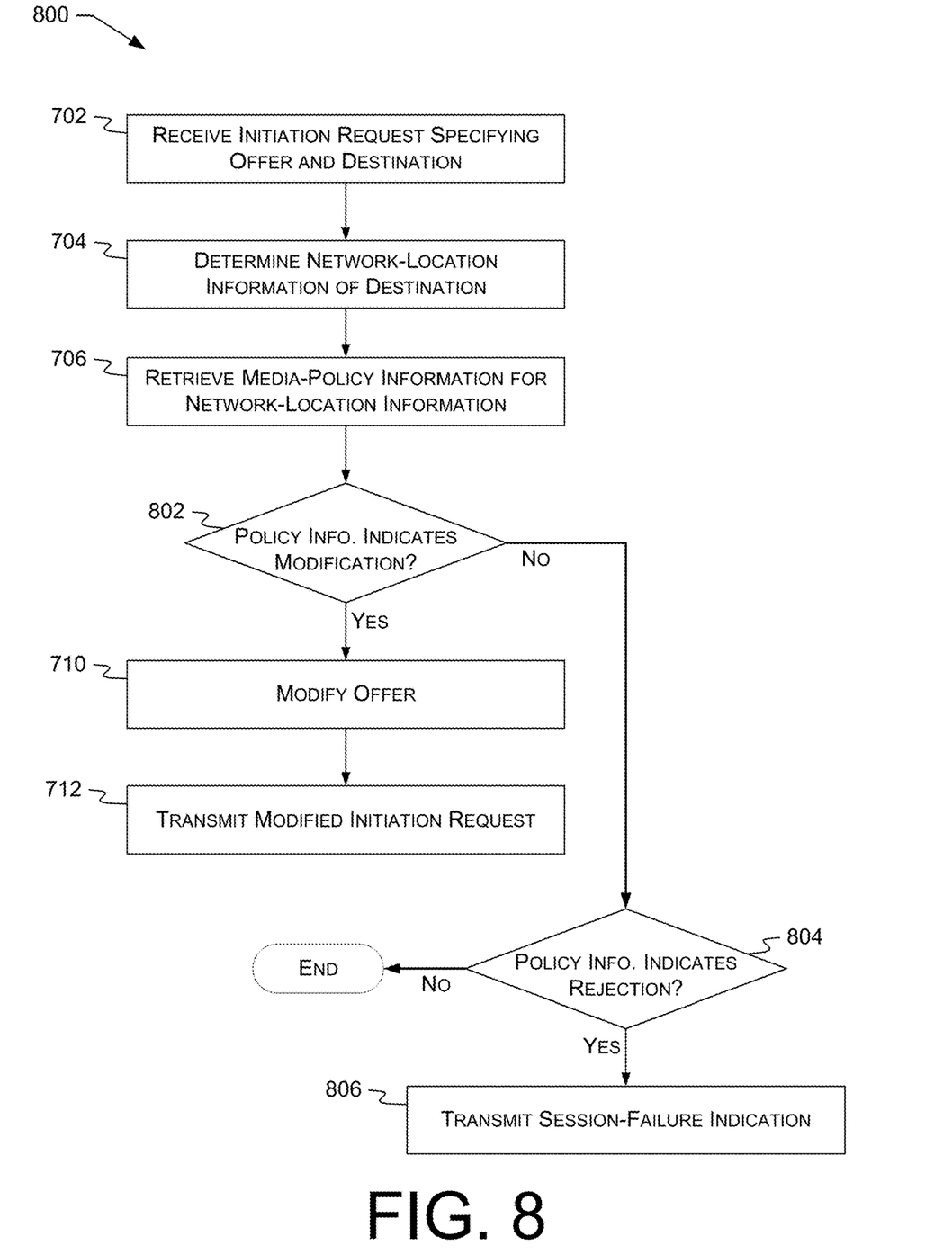
FIG. 8 illustrates an example process for establishing a communication session according to some implementations.

FIG. 7 illustrates an example process 700 for establishing a communication session performed, e.g., by a core network device, e.g., the server 204 communicatively connectable with UE, e.g., computing device 202 of a telecommunications network 206 (all FIG. 2). In some examples, the core network device includes one or more processors configured to perform operations described below, e.g., in response to computer program instructions of the offer-processing module 230. Operations shown in FIG. 7 and in FIG. 8, discussed below, can be performed in any order except when otherwise specified, or when data from an earlier step is used in a later step. For clarity of explanation, reference is herein made to various components shown in FIGS. 1-3 that can carry out or participate in the steps of the exemplary method. It should be noted, however, that other components can be used; that is, exemplary method(s) shown in FIGS. 7 and 8 are not limited to being carried out by the identified components.

At 702, the server 204, e.g., the processor 226, receives an initiation request of a communication session, e.g., a SIP INVITE. The initiation request includes information of a destination, e.g., in a SIP request or header, and an offer, e.g., one or more media capabilities, e.g., in an SDP body carried with the SIP request. This can be done, e.g., as described above with reference to the I-CSCF 402 and the I-CSCF 602.

At 704, the server 204 determines network-location information of the destination. This can be done, e.g., as described above with reference to the HSS 304. In some examples, the initiation request is received via a network (e.g., a particular IMS) and the network-location information indicates whether the destination is connected to the network (e.g., whether the MT UE is registered in the same IMS as the MO UE).

At 706, the server 204 retrieves media policy information corresponding to the network-location information from a policy source component. The policy source component can include, e.g., a capability registry 234 such as a Diameter, DNS, or ENUM server, a database on computer-readable media 228, or another source of media policy information. Media policy information can indicate, e.g., capabilities allowed or required to be used in, or prohibited from being used in, communication sessions with computing device(s) corresponding to the network-location information. Media policy information can additionally or alternatively correspond to SIP headers in a SIP INVITE or other information in a session-initiation request, e.g., SIP P-Access-Network information.

Examples of media policy information are shown in Table 1. The example rows in Table 1, and other rows, can be used in any combination. The example of Table 1 uses LIA Diameter response codes as the network-location information.

TABLE 1

| # | Location Information | SDP Check Type | Action | Target |
|---|---|---|---|---|
| 1 | 2001 | Codec | None | None |
| 2 | 2003 | Codec | Remove | EVS |
| 3 | 5001 | Codec | Remove | EVS |
| 4 | 5001 | Codec | Add | G.711 |
| 5 | 2001 | Codec | Add | H.264 |
| 6 | 5001 | Video QoS | Remove | AVPF |
| 7 | 5001 | Preconditions | Replace: Mandatory → Optional | Strength Tag |

In Table 1, "Location Information" indicates the network-location information. "SDP Check Type" indicates which field(s) of the SDP body (or, in general, which type(s) of capabilities) the row applies to. Other criteria can be used instead of or in addition to Location Information and SDP Check Type, e.g., SIP header values or other fields in the SDP body. In an example, the destination network of a NNI connection can serve as a criterion in the media policy information. In some examples, IMS registration information, or an element of the session-initiation request, can indicate that the MO UE or MT UE is a computing device or other electronic device. In some of these examples, the offer can be modified to remove all codecs but one, or to leave only one listed capability of any particular type. This can be used, e.g., to facilitate communications between a human using a UE capable of processing multiple codecs and an automated system configured to use only one codec. In some examples, capabilities can be added to calls placed on a single operator's network between that operator's customers using hardware approved by that operator, since the operator in that situation can have reliable knowledge of which codecs or other capabilities are supported.

In Table 1, "Action" indicates whether to add value(s), remove value(s), modify value(s), or take no action ("None") with respect to the indicated field(s) or type(s) of capabilities. "Target" indicates the value to add, remove, or modify. For example, Row 1 indicates that no codec changes are necessary for a Diameter 2001 response (in some examples, the same effect can be achieved by omitting row 1). Other example targets include protocol selections. For example, the media policy information can indicate whether a User Datagram Protocol (UDP) or Transmission Control Protocol (TCP) transport should be used for Message Session Relay Protocol (MSRP) traffic in an RCS session via NNI.

At 708, the server 204 determines whether the media policy information indicates modification of the offer (the information of the media capabilities). For example, the server 204 can match patterns in the media policy information against the offer. If modification is indicated, the next block is block 710. If not, the process can terminate.

At 710, the server 204, in response to media policy information indicating modification of the initiation request, modifies the offer (the information of the one or more media capabilities) based at least in part on the media policy information. For example, row 3 of Table 1 is triggered by a Diameter 5001. User Unknown error, e.g., for an IMS-originated session to a PSTN number. Based on the media policy information, the EVS codec (Target) is removed (Action) before passing the session-initiation message to the MGCF 312 for bridging to the PSTN. In another example shown in row 7 of Table 1, some offers include quality-of-service preconditions, e.g., as defined in Request for Comments (RFC) 3312. The strength tag of those preconditions indicates whether the session can be established even if the preconditions are not met ("optional") or whether the preconditions must be met to establish the session ("mandatory"). The strength tag can be replaced or modified, e.g., from "mandatory" to "optional," so that the call can be established even if the preconditions are not met. This can permit, e.g., communications sessions between an MO UE supporting quality of service (QoS) and an MT UE not supporting QoS.

In another example not shown, the WB-AMR codec (Target) can be removed (Action) before passing the session-initiation message to a 3G or other network that does not support WB-AMR. In still another example not shown, the Real-time Transport Protocol (RTP) Audio-visual Profile with extended Feedback (AVPF, defined in RFC 4585) (Target) can be removed (Action) from the offer (e.g., the SDP body) before passing the session-initiation message of a video call to a network or MT UE that does not support AVPF.

In some examples, the information of the one or more media capabilities specifies a video session. For example, the SDP body of a SIP INVITE can include an indication of one or more video codec(s), e.g., one or more lines beginning with "m=video". In some examples, the media policy information indicates removal of the video-session specification from the information of the one or more media capabilities. For example, the media policy information can specify that all "m=video . . . " lines and corresponding media description lines should be removed from the offer. Media description lines can include, e.g., lines beginning with "i=", "c=", "b=", "k=", or "a=" after the "m=video . . . " line and before the next consecutive "m= . . . " line (RFC 4566, section 5, pg. 8).

At 712, the server 204 transmits the initiation request including the modified information of the one or more media capabilities. This can be done, e.g., as discussed above with reference to core network device 124 shown in FIGS. 1 and 2. Transmitting the modified initiation request can permit interworking between networks without any change to or increased requirements of the MO UE or MT UE, permitting the use of simpler UE for interworking. The process shown, and other processes and operations herein, can be repeated, e.g., for multiple session-initiation requests. Blocks 708 and 710 can be repeated to modify each of multiple SDP bodies or other offers in a session, e.g. during a negotiation phase of the session, and the modified offers can be transmitted as part of the corresponding messages.

FIG. 8 illustrates an example process 800 for establishing a communication session performed, e.g., by a core network device, e.g., the server 204, FIG. 2. Blocks 702, 704, 706, 710, and 712 can be as discussed above with reference to FIG. 7.

At 802, the server 204 determines whether the media policy information indicates modification of the offer. This can be done, e.g., as discussed above with reference to FIG. 7. If modification is indicated, the next block is block 710. If not, the next block is block 804.

At 804, the server 204 determines whether the media policy information indicates rejection of the initiation request. If so, the next block is block 806. If not, the process can terminate. In some examples, if the SDP body is encrypted or otherwise unreadable by the server 204, the server 204 can determine that the initiation request should be rejected.

At 806, the server 204 transmits a session-failure indication 122, e.g., to the MO UE. The session-failure indication 122 can be, e.g., a SIP 488 response, as discussed above with reference to FIG. 1. In some examples, the transmitted session-failure indication 122 includes at least an indication of a media type or codec corresponding to the media policy information. This permits the MO UE to retry, e.g., without a disallowed capability or with a preferred or required capability. For example, the MO UE can retry a video call as a voice call if the MT UE or terminating network does not support video. Transmitting the session-failure indication 122 can reduce load on the network and resource consumption of the I-CSCF or other core network device.

Example data transmissions (parallelograms) in FIGS. 1 and 2, example data exchanges in the call flow diagrams of FIGS. 3-6, and example blocks in the process diagram of FIGS. 7 and 8 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions are described is not intended to be construed as a limitation, and any number of the described transmissions can be combined in any order and/or in parallel to implement the processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising, by a first core network device of an Internet Protocol (IP) Multimedia System (IMS), the first core network device being an interrogating call session control function (I-CSCF) device:
    receiving from a session-originating device an initiation request of a communication session, the initiation request including information of a destination and information of one or more media capabilities, wherein the session-originating device is associated with the IMS;
    determining network-location information of the destination, the network-location information corresponding to a second core network device, the second core network device being a Breakout Gateway Control Function (BGCF) device or a serving call session control function (S-CSCF) device,
    wherein the network-location information comprises a Diameter result code indicating that the destination is one of:
        an IMS-capable destination connected to the IMS via a packet network,
        an IMS-capable destination connected via a non-packet network, or
        a non-IMS-capable destination, and
    wherein the network-location information indicates a network to which the destination is connected and whether the destination is connected to the IMS;
    retrieving, from a capability registry and as retrieved information, capability information, media policy information, or modification information corresponding to the network-location information;
    determining that the information of the one or more media capabilities does not correspond to the retrieved information; and
    in response, transmitting a session-failure indication to the session-originating device, the session-failure indication including one or more codecs corresponding to the network-location information, the session-failure indication indicating one or more media capabilities that do not correspond to the capability information.

2. The method of claim 1, wherein the initiation request includes a Session Initiation Protocol (SIP) INVITE message having a Session Description Protocol (SDP) body including the information of the one or more media capabilities.

3. The method of claim 1, wherein the information of the one or more media capabilities specifies one or more codecs that do not correspond to the retrieved information.

4. The method of claim 1, wherein the retrieved information specifies one or more capabilities to add to the information of the one or more media capabilities.

5. The method of claim 4, wherein the one or more capabilities to add include one or more codecs.

6. The method of claim 1, wherein the session-originating device includes voice-over-Long Term Evolution (VoLTE) user equipment and the network-location information includes an indication that the destination is connected to a non-VoLTE network.

7. The method of claim 1, wherein the retrieved information specifies one or more capabilities to remove from the information of the one or more media capabilities.

8. A method comprising, by a first core network device of an Internet Protocol (IP) Multimedia System (IMS):
    receiving an initiation request of a communication session, the initiation request associated with a session-originating device and including information of a destination and information of one or more media capabilities, the first core network device being an interrogating call session control function (I-CSCF) device, wherein the session-originating device is associated with the IMS;
    determining network-location information of the destination, the network-location information corresponding to a second core network device, the second core network device being a Breakout Gateway Control Function (BGCF) device or a serving call session control function (S-CSCF) device,
    wherein the network-location information comprises a Diameter result code indicating that the destination is one of:
        an IMS-capable destination connected to the IMS via a packet network,
        an IMS-capable destination connected via a non-packet network, or
        a non-IMS-capable destination, and
    wherein the network-location information indicates a network to which the destination is connected and that the destination is not connected to the IMS;
    retrieving, as retrieved information, information corresponding to the network-location information from a policy source component; and
    in response to the retrieved information indicating rejection of the initiation request, transmitting a session-failure indication, the session-failure indication including one or more codecs corresponding to the network-location information, the session-failure indication indicating one or more media capabilities that do not correspond to capability information in the retrieved information.

9. The method of claim 8, wherein the session-failure indication includes at least an indication of a media type or codec corresponding to the retrieved information.

10. The method of claim 8, wherein the information of the one or more media capabilities specifies a video session, and the retrieved information indicates removal of video-session specification from the information of the one or more media capabilities.

11. The method of claim 8, wherein the initiation request includes a Session Initiation Protocol (SIP) INVITE message having a Session Description Protocol (SDP) body including the information of the one or more media capabilities.

12. The method of claim 8, wherein the information of the one or more media capabilities specifies one or more codecs that do not correspond the retrieved information.

13. The method of claim 8, wherein the retrieved information specifies one or more capabilities to add to the information of the one or more media capabilities.

14. The method of claim 13, wherein the one or more capabilities to add include one or more codecs.

15. The method of claim 8, wherein the retrieved information specifies one or more capabilities to remove from the information of the one or more media capabilities.

16. The method of claim 8, wherein the session-originating device includes voice-over-Long Term Evolution (VoLTE) user equipment and the network-location information includes an indication that the destination is connected to a non-VoLTE network.

17. An interrogating call session control function (I-CSCF) device of an Internet Protocol (IP) Multimedia System (IMS), the I-CSCF device comprising:
  one or more processor devices; and
  one or more tangible, non-transitory computer-readable media comprising instructions that, when executed by the one or more processor devices, cause the one or more processor devices to perform operations comprising:
    receiving from a session-originating device an initiation request of a communication session, the initiation request including information of a destination and information of one or more media capabilities, wherein the session-originating device is associated with the IMS;
    determining network-location information of the destination, the network-location information corresponding to a core network device, the core network device being a Breakout Gateway Control Function (BGCF) device or a serving call session control function (S-CSCF) device,
    wherein the network-location information comprises a Diameter result code indicating that the destination is one of:
      an IMS-capable destination connected to the IMS via a packet network,
      an IMS-capable destination connected via a non-packet network, or
      a non-IMS-capable destination, and
    wherein the network-location information indicates a network to which the destination is connected and whether the destination is connected to the IMS;
    retrieving, from a capability registry and as retrieved information, capability information, media policy information, or modification information corresponding to the network-location information;
    determining that the information of the one or more media capabilities does not correspond to the retrieved information; and
    in response, transmitting a session-failure indication to the session-originating device, the session-failure indication including one or more codecs corresponding to the network-location information, the session-failure indication indicating one or more media capabilities that do not correspond to the capability information.

18. The I-CSCF device of claim 17, wherein the initiation request includes a Session Initiation Protocol (SIP) INVITE message having a Session Description Protocol (SDP) body including the information of the one or more media capabilities.

19. The I-CSCF device of claim 17, wherein the information of the one or more media capabilities specifies one or more codecs that do not correspond the retrieved information.

20. The I-CSCF device of claim 17, wherein the session-originating device includes voice-over-Long Term Evolution (VoLTE) user equipment and the network-location information includes an indication that the destination is connected to a non-VoLTE network.

* * * * *